United States Patent [19]

Kodama et al.

[11] Patent Number: 4,887,572

[45] Date of Patent: Dec. 19, 1989

[54] SIGNAL GENERATING ROTOR OF A DISTRIBUTOR FOR AN INTERNAL COMBUSTION ENGINE AND A METHOD OF PRODUCING THE SAME

[75] Inventors: Seiki Kodama; Shigemi Murata, both of Himeji, Japan

[73] Assignee: Mitsubishi Denki Kabushiki Kaisha, Tokyo, Japan

[21] Appl. No.: 259,375

[22] Filed: Oct. 18, 1988

[30] Foreign Application Priority Data

Nov. 9, 1987 [JP] Japan ................................ 52-170982

[51] Int. Cl.⁴ .......................... F22D 1/00; G01B 7/30; F02P 5/04

[52] U.S. Cl. .................................... 123/414; 324/208; 123/617; 123/146.5 A

[58] Field of Search ............... 123/414, 415, 416, 147, 123/145.6 A, 643, 617; 324/208

[56] References Cited

U.S. PATENT DOCUMENTS

| | | | |
|---|---|---|---|
| 4,401,066 | 8/1983 | Brand et al. | 123/146.5 A |
| 4,462,347 | 7/1984 | Brammer et al. | 123/146.5 A |
| 4,726,338 | 2/1988 | Decker et al. | 123/414 |
| 4,742,811 | 5/1988 | Okada et al. | 123/643 |
| 4,760,827 | 8/1988 | Schreiber et al. | 123/414 |
| 4,765,306 | 8/1988 | Scarnara et al. | 123/414 |
| 4,783,627 | 11/1988 | Pagel et al. | 324/208 |
| 4,808,934 | 2/1989 | Yokoyama et al. | 123/617 |
| 4,810,967 | 3/1989 | Yokohama et al. | 328/208 |

FOREIGN PATENT DOCUMENTS

| | | | |
|---|---|---|---|
| 59-74373 | 4/1984 | Japan | 123/414 |

*Primary Examiner*—Raymond A. Nelli

*Attorney, Agent, or Firm*—Sughrue, Mion, Zinn, Macpeak and Seas

[57] ABSTRACT

An ignition timing signal generating rotor adapted to be operatively coupled to the shaft of a distributor for an internal combustion engine is disclosed wherein the rotor generates an ignition timing signal in cooperation with an ignition timing sensor operatively coupled to the housing of the distributor. The rotor comprises a reluctance varying rotor portion of a magnetic material and a tube of a non-magnetic material carrying the magnetic rotor portion. The magnetic rotor portion and the non-magnetic tube are made of formed powder materials which are simultaneously sintered together into a single piece.

10 Claims, 2 Drawing Sheets

SIGNAL GENERATING ROTOR OF A DISTRIBUTOR FOR AN INTERNAL COMBUSTION ENGINE AND A METHOD OF PRODUCING THE SAME

BACKGROUND OF THE INVENTION

1. Field of the Invention

The present invention relates to a distributor for an internal combustion engine, and more particularly, to a magnetic rotor thereof for generating an ignition timing signal in cooperation with an ignition timing sensor which is disposed in an opposing relation with the rotor. The present invention also relates to a method of producing such a rotor.

2. Description of the Related Art

FIG. 1 shows the longitudinal sectional view of a distributor for supplying a high voltage to the spark plugs of an internal combustion engine. The distributor comprises an ignition timing signal generator which has a rotor of a magnetic material (the top view of which is shown in FIG. 2) and a fixed sensor opposing the rotor. The structure of the distributor is as follows.

The distributor may be divided into a rotating and a static portion. The rotating portion of the distributor comprises: a shaft 1 rotating in synchronism with a crank shaft of the internal combustion engine; a spark advancing sleeve 2 which is rotatably mounted on the shaft 1 and which is driven by the shaft 1 through the intermediary of a centrifugally-operated spark advancing mechanism 3; a reluctor 4 in the form of an ignition timing signal generating rotor of a magnetic material, which is secured to the spark advancing sleeve 2 through a tube 5 of a non-magnetic material which magnetically disconnects the signal generating rotor 4 from the sleeve 2; and a distributor rotor 6 fixedly secured to the spark advancing sleeve 2.. The spark advancing mechanism 3 includes a member 1*a* fixedly secured to the shaft 1, a pair of centrifugal members 3*a*, each of which is rotatably mounted on the member 1*a* by means of a pin 3*b* and is urged inwardly by a helical spring 3*c* having one end coupled to the member 1*a* and the other end coupled to an end portion of a centrifugal member 3*a*, and a pair of slotted members 3*d* fixedly secured to the sleeve 2. Each one of the members 3*d* has a curved slot 3*e* through which a cylindrical post 3*f*, which is fixedly secured to an associated centrifugal member 3*a*, slidably extends so as to allow rotational motion of the centrifugal members 3*a* with respect to the members 1*a* , whereby the outward turning motion of the centrifugal members 3*a* caused by the centrifugal force acting thereon in opposition to the urging forces of the springs 3*c* brings about relative rotational motion of the slotted members 3*d* and the sleeve 5 fixed thereto, with respect to the shaft 1 and the member 1*a* fixed thereto.

The static portion of the distributor comprises: a cup-shaped housing base 7 through which the shaft 1 rotatably extends; a housing cap 8 secured to the housing base 7; an annular cover 9 interposed between the housing base 7 and the cap 8 for partitioning the distributor rotor 6 from the space below; a vacuum-operated spark advancing mechanism 10 secured to the housing base 7; a spark advancing annular plate 10*a* of the vacuum-operated spark advancing mechanism 10, which is rotatably mounted on the housing base 7 so as to be advanced in rotational angle by the vacuum-operated spark advancing mechanism 10; and an ignition timing sensor 11 which opposes the signal generating rotor 4 and which is fixedly secured to the spark advancing annular plate 10*a*.

The ignition timing sensor 11 comprises a permanent magnet (not shown) for generating a magnetic flux A passing through the magnetic rotor 4, whereby the non-magnetic tube 5 reduces the leakage flux B to prevent exterior leakage magnetic flux from adversely affecting the function of the sensor 11 and also to enhance the efficiency of the permanent magnet built in the sensor 11. The annular magnetic rotor 4 has a plurality of projections 4*a* extending in the radial direction from the outer circumferential surface thereof, as shown in FIG. 2. Thus, the reluctance of the magnetic circuit comprising the rotor 4 varies when the rotor 4 rotates with the sleeve 2 in synchronism with the unillustrated crankshaft of the internal combustion engine. The resulting change of the magnetic flux is converted into a voltage signal by a pickup coil (not shown) of the sensor 11 disposed in the magnetic flux. The voltage signal obtained by the pickup coil is utilized to generate an ignition timing signal, by means of which the breaking and making of the current through the primary winding of the ignition coil (not shown) is controlled. The high voltage generated in the secondary winding of the ignition coil is supplied to the distributor rotor 6 through a brush 6*a* and to the spark plugs of the internal combustion engine in correct sequence through a rotor electrode 6*b* and a plurality of circumferentially spaced fixed electrodes 8*a* opposing thereto.

In operation, the spark advancing sleeve 2 rotates with the shaft 1 in synchronism with the crankshaft of the internal combustion engine (not shown) in such a manner that the relative rotational angle of the sleeve 2 with respect to the shaft 1 is advanced by the centrifugally-operated spark advancing mechanism 3 in proportion to the rotational speed of the shaft 1 due to the centrifugal forces acting on the centrifugal members 3*a*. The rotational or angular position of the timing sensor 11, on the other hand, is advanced by the vacuum-operated spark advancing mechanism 10 which advances the rotational position of the annular member 10*a* with respect to the housing base 7. Thus, the ignition timing sensor 11 generates the ignition timing signal at the optimum rotational position of the engine crankshaft.

In the case of the above-described conventional distributor, the signal generating magnetic rotor 4 and the non-magnetic tube 5 are produced as separate parts, and are assembled and secured together by means of shrinkage fit, force fit, or a fixing pin. Thus, the conventional signal generating rotor has the disadvantage that it needs a separate part to be mounted on the spark advancing sleeve. This results in an increased number of producing and assembling steps and in an increased difficulty in securely coupling the magnetic rotor to the non-magnetic tube.

SUMMARY OF THE INVENTION

Thus, a main object of the present invention is to provide an ignition timing signal generating rotor which is adapted to be operatively coupled to the shaft of a distributor for an internal combustion engine, so that the number of steps required to produce the magnetic rotor portion and the non-magnetic tube and assemble them together is reduced, and in which the magnetic rotor and the non-magnetic tube are securely coupled together.

A further object of the present invention is to provide an ignition timing signal generating rotor which can be produced at low cost.

Thus, the signal generating rotor according to the present invention comprises an annular reluctance varying rotor portion of a magnetic material and a tube of a non-magnetic material carrying the magnetic rotor portion, wherein the magnetic rotor portion and the non-magnetic tube are made of materials which are simultaneously sintered together into a single piece.

As a result, the number of producing and assembling steps is reduced, which also results in a reduced cost of production. Further, the magnetic rotor portion and the non-magnetic tube are securely coupled together, thereby enhancing the reliability of the rotor.

The present invention also provides a method of producing such a signal generating rotor and a distributor for an internal combustion engine which has such a signal generating rotor.

BRIEF DESCRIPTION OF THE DRAWINGS

Further objects of the structure and operation of the present invention will become more clear from the following detailed description of a few preferred embodiments thereof when taken in conjunction with the accompanying drawings, in which.

In the drawings, like reference numerals represent like or corresponding parts or portions.

DETAILED DESCRIPTION OF THE PREFERRED EMBODIMENTS

Figure 1:
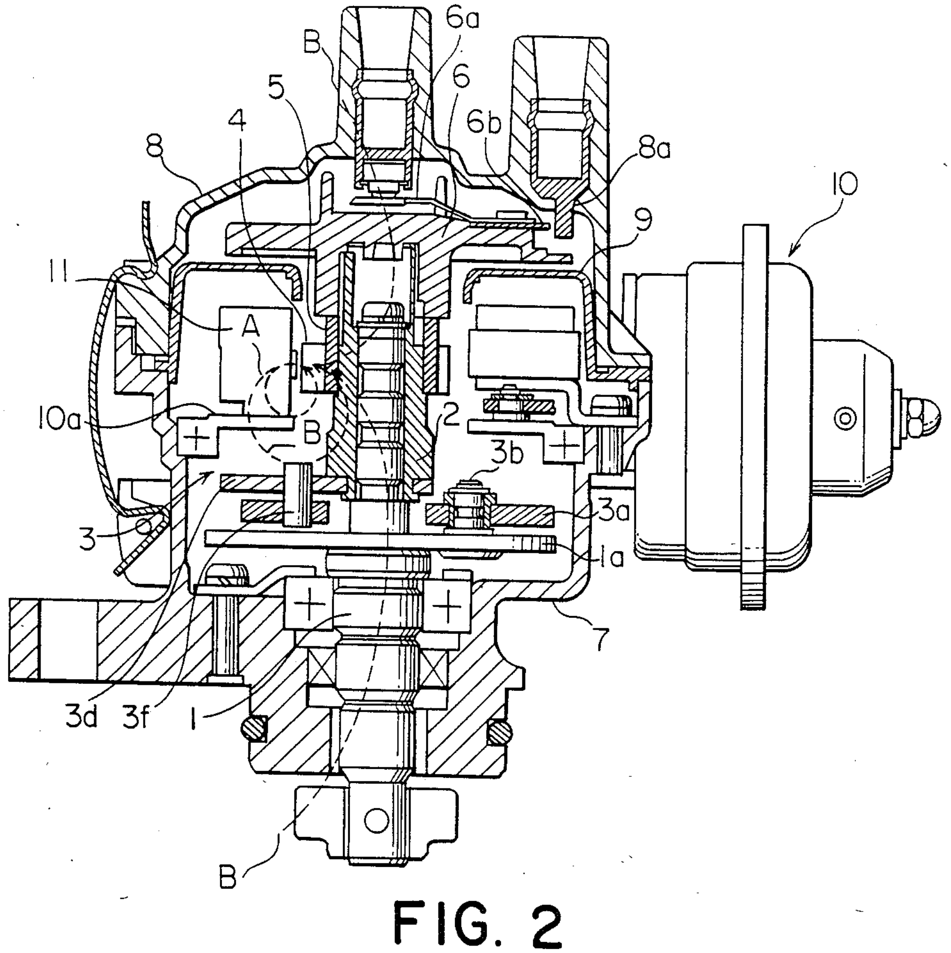
FIG. 1 is a longitudinal sectional view of a distributor for an internal combustion engine, showing a typical structure thereof in which an ignition timing signal generating rotor according to the present invention may be incorporated.
Figure 2:
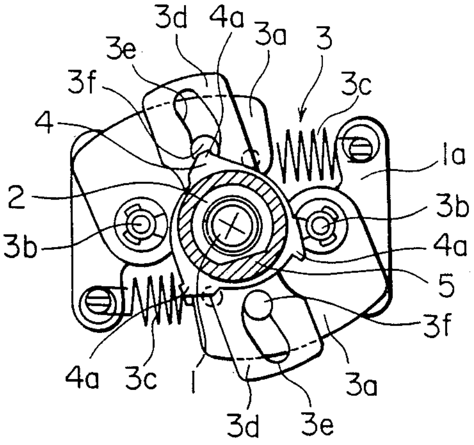
FIG. 2 is a top view of the signal generating rotor disposed in the distributor of FIG. 1.
Figure 3:
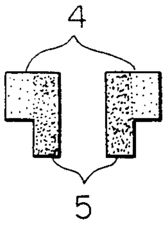
FIG. 3 is a longitudinal sectional view of an ignition timing signal generating rotor according to the present invention; and ·

Referring to FIG. 3 which is the longitudinal sectional view of a signal generating rotor according to the present invention, the signal generating rotor comprises an annular magnetic rotor 4 and a non-magnetic tube 5 which have forms similar to those of the rotor 4 and the tube 5 of FIGS. 1 and 2, respectively. Thus, the annular rotor 4 made of a magnetic material comprises a plurality of projections **4*a* extending radially from the outer circumferential surface thereof, as shown in FIG. 2. Further, the rotor 4 and the tube 5 are mounted in a distributor as shown in FIGS. 1 and 2; namely, the tube 5 of a non-magnetic material is fitted around a spark advancing sleeve 2 so that the rotor 4 opposes an ignition timing sensor 11. The structure and operation of the distributor comprising the rotor 4 and the tube 5** are as described above.

Figure 4A:
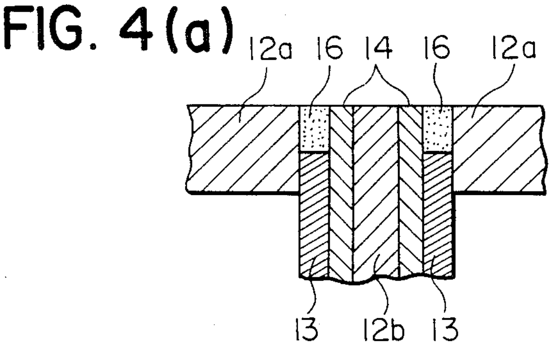
FIGS. 4 (*a*) through (*c*) are cross-sectional views of a molding press, showing the steps of forming and pressing powders of magnetic and non-magnetic materials in the process of producing the rotor of FIG. 3.
Figure 4B:
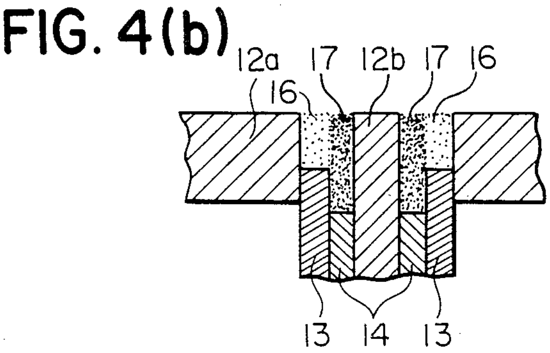
Figure 4C:
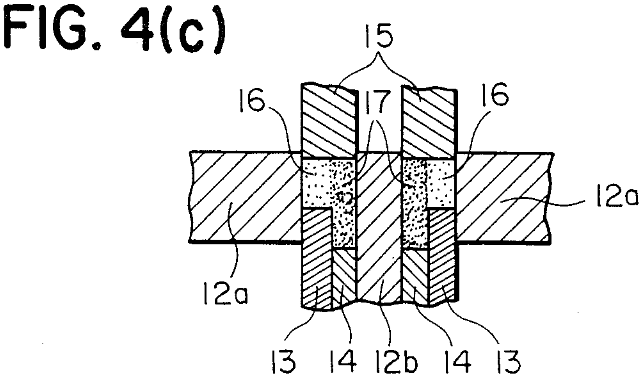

According to the present invention, however, the rotor 4 and the tube 5 are produced as a single piece by a sintering process. Before the sintering, magnetic and non-magnetic powders are formed into a predetermined shape as shown in FIG. 3, utilizing frames and a press. FIGS. 4(*a*) through 4(*c*) illustrates one example of such a forming process, which comprises the step of: filling a powder of a magnetic material into an annular space formed by frames (FIG. 4(*a*)); filling a powder of a non-magnetic material into an annular space formed between the frames and the cylindrically formed magnetic powder (FIG. 4(*b*)); and pressing the magnetic and non-magnetic powders by a press into a predetermined shape (FIG. 4(*c*)). The molding press utilized in this process comprises: a thick plate-shaped outer fixed frame **12*a* having a central cylindrical bore which has an inner surface having a form corresponding to the outer side surface of the rotor 4; a solid cylindrical central fixed frame 12*b* extending into the central bore in the outer fixed frame 12*a* from below, the top end surface of the central fixed frame 12*b* being flush with the upper surface of the outer fixed frame 12*a*; first and second hollow cylindrical movable frames 13 and 14, the second movable frame 14 being slidable on the outer circumferential surface of the central fixed frame 12*b*, and the first movable frame 13 being slidably fitting into the annular space formed between the interior surface of the bore in the outer fixed frame 12*a* and the outer circumferential surface of the second movable frame 14; and a press 15 in the form of a hollow cylinder slidably fitted into the annular space formed between the outer and central fixed frames 12*a* and 12*b***.

During the first step of forming a magnetic powder, the first and second movable frames 13 and 14 are slid into the annular space formed between the outer and central fixed frames **12*a* and 12*b*, as shown in FIG. 4** (*a*), so that the top surface of the second movable frame 14 is made flush with the top end surfaces of the first and second fixed frames **12*a* and 12*b*, and the top surface of the first movable frame 13 is held at a predetermined distance therebelow. Next, a powder of a magnetic material 16 is filled into the annular space formed above the first movable frame 13 between the outer fixed frame 12*a* and the second movable frame 14. Then, the second movable frame 14 is slid down to a predetermined level to form a tubular space between the inner circumferential surface of the magnetic powder 16 and the outer circumferential surface of the central fixed frame 12*b*, as shown in FIG. 4**(*b*). Thereafter, a powder of a non-magnetic material 17, e.g. powder of copper or aluminum, is filled into the thus formed tubular space. In this connection, it should be noted that though a portion of the magnetic powder 16 may fall off when the second movable frame 14 is slid down, this has little adverse effects and is negligible. The press 15 is then lowered into the space between the fixed frames **12*a* and 12*b* to press the powders 16 and 17 into a predetermined shape and density, as shown in FIG. 4** (*c*). The powder blocks 16 and 17 thus obtained are sintered to obtain the rotor 4 and the tube 5 shown in FIG. 3, the portions 16 and 17 corresponding to the rotor 4 and the tube 5, respectively.

In the powder forming process as described above, the magnetic powder 16 is filled first and the non-magnetic powder 17 second. However, the order may be reversed, namely, the non-magnetic powder 17 may be filled first and the magnetic powder 16 second.

What is claimed is:

1. An ignition timing signal generating rotor adapted to be operatively coupled to a shaft of a distributor for an internal combustion engine which rotates in synchronism with an engine crankshaft, said signal generating rotor comprising:

an annular reluctance varying rotor portion made of a sintered powder of a magnetic material, said reluctance varying rotor portion having the form of a short hollow cylinder which has a plurality of projections radially outwardly extending from an outer circumferential surface thereof, so that a reluctance of a magnetic circuit formed in said reluctance varying rotor portion is varied in synchronism with the rotation of said rotor portion; and a tube made of a sintered powder of a non-magnetic material adapted to be coupled to a spark advancing sleeve operatively connected to the shaft of said distributor, said tube being secured to an interior circumferential surface of said reluctance varying rotor portion, wherein said tube and said reluctance varying rotor portion are made of materials sintered simultaneously in a single piece.

2. An ignition timing signal generating rotor as claimed in claim 1, wherein said reluctance varying rotor portion is made of a sintered powder of iron, and said tube is made of a sintered powder of a non-magnetic material selected from the group consisting of copper and aluminum.

3. A method of producing an ignition timing signal generating rotor as claimed in claim 1 by using a pressing mold having a fixed and a movable frame, comprising the steps of:

filling a powder of a magnetic material into an annular space formed by the fixed and movable frames of said pressing mold;

filling a powder of a non-magnetic material into a tubular space formed by the inside of the filled powder of the magnetic material and by the fixed and movable frames of said pressing mold;

pressing the powders of the magnetic and non-magnetic materials in the fixed and movable frames by a press, thereby forming the powders into a predetermined shape; and sintering the pressed powders simultaneously into a single piece.

4. A method of producing an ignition timing signal generating rotor as claimed in claim 3, wherein said magnetic material comprises iron, and said non-magnetic material comprises a material selected from the group consisting of copper and aluminum.

5. A method of producing an ignition timing signal generating rotor as claimed in claim 1 by using a pressing mold having a fixed and a movable frame, comprising the steps of:

filling a powder of a non-magnetic material into a tubular space formed by the fixed and movable frames of said pressing mold;

filling a powder of a magnetic material into an annular space formed by the outside of the filled powder of the non-magnetic material and by the fixed and movable frames of said pressing mold;

pressing the powders of the magnetic and non-magnetic materials by a press, thereby forming the powders into a predetermined shape; and sintering the pressed powders simultaneously in a single piece.

6. A method of producing an ignition timing signal generating rotor as claimed in claim 5, wherein said magnetic material comprises iron, and said non-magnetic material comprises a material selected from the group consisting of copper and aluminum.

7. A distributor for an internal combustion engine comprising:

a housing;

a distributor shaft rotatably extending in said housing, said shaft rotating in synchronism with an engine crankshaft;

a tube made of a sintered powder of a non-magnetic material operatively coupled to said distributor shaft;

an annular reluctance varying rotor made of a sintered powder of a magnetic material fixedly secured to an outer circumferential surface of said tube, said reluctance varying rotor having the form of a short hollow cylinder which has a plurality of projections radially outwardly extending from an outer circumferential surface thereof, so that a reluctance of a magnetic circuit formed in said reluctance varying rotor is varied in synchronism with the rotation of said rotor, said reluctance varying rotor and said tube being made of materials sintered simultaneously into a single piece; and an ignition timing sensor operatively coupled to the housing, said sensor including a permanent magnet and pickup coil means for detecting a variation in magnetic flux caused by a change of a reluctance due to the rotation of said reluctance varying rotor.

8. A distributor for an internal combustion engine as claimed in claim 7, wherein said tube of a non-magnetic material is fixedly mounted on a spark advancing sleeve rotatably mounted on said distributor shaft, said spark advancing sleeve being driven by said distributor shaft through the intermediary of a centrifugally-operated spark advancing mechanism.

9. A distributor for an internal combustion engine as claimed in claim 7, wherein said ignition timing sensor is fixedly mounted on a spark advancing annular plate rotatably supported on said housing, the rotational angle of said spark advancing annular plate being advanced with respect to said housing by a vacuum-operated spark advancing mechanism.

10. A distributor for an internal combustion engine as claimed in claim 7, wherein said non-magnetic material comprises a material selected from the group consisting of copper and aluminum, and said magnetic material comprises iron.

* * * * *